(12) United States Patent
Sakakihara et al.

(10) Patent No.: US 7,912,787 B2
(45) Date of Patent: Mar. 22, 2011

(54) INFORMATION PROCESSING APPARATUS AND LICENSE DISTRIBUTION SYSTEM

(75) Inventors: Hironori Sakakihara, Kawasaki (JP); Fumio Honda, Kawasaki (JP); Shuichi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 12/328,568

(22) Filed: Dec. 4, 2008

(65) Prior Publication Data
US 2009/0150666 A1 Jun. 11, 2009

(30) Foreign Application Priority Data
Dec. 10, 2007 (JP) ................. 2007-318854

(51) Int. Cl.
*G06F 21/00* (2006.01)
(52) U.S. Cl. ............ 705/59; 705/51; 713/156; 713/157; 713/158; 713/185; 709/219; 709/229; 725/109; 725/141
(58) Field of Classification Search .............. 705/51, 705/57, 59; 713/156–158
See application file for complete search history.

(56) References Cited

U.S. PATENT DOCUMENTS

| | | | |
|---|---|---|---|
| 7,065,648 B1* | 6/2006 | Kamibayashi et al. ........ | 713/171 |
| 7,500,104 B2* | 3/2009 | Goland ........................... | 713/175 |
| 7,614,078 B1* | 11/2009 | Stieglitz ......................... | 726/2 |
| 7,627,903 B2* | 12/2009 | Kamperman et al. .......... | 726/27 |
| 7,752,433 B2* | 7/2010 | Yamauchi et al. ............. | 713/156 |
| 2003/0076955 A1* | 4/2003 | Alve et al. ..................... | 380/201 |
| 2003/0225863 A1* | 12/2003 | Kajino et al. .................. | 709/219 |
| 2004/0174824 A1* | 9/2004 | Ohta et al. ..................... | 370/252 |
| 2008/0195686 A1* | 8/2008 | Son et al. ....................... | 709/201 |
| 2009/0070483 A1* | 3/2009 | Futa et al. ...................... | 709/234 |

FOREIGN PATENT DOCUMENTS

| | | |
|---|---|---|
| EP | 1603044 | 12/2005 |
| EP | 1603045 | 12/2005 |
| EP | 1615404 | 1/2006 |
| EP | 1682963 | 7/2006 |
| EP | 1736888 | 12/2006 |
| JP | 2000-357213 | 12/2000 |

(Continued)

OTHER PUBLICATIONS

"Extended European Search Report", mailed Jun. 29, 2009 from EP Patent Office for corresponding EP Patent Application No. 08163197.0.

(Continued)

*Primary Examiner* — Andrew J. Fischer
*Assistant Examiner* — Mamon Obeid
(74) *Attorney, Agent, or Firm* — Fujitsu Patent Center

(57) ABSTRACT

There are provided an information processing apparatus and a license distribution system including the information processing apparatus in which the reproduction or duplication of a content can be limited to the interior of a domain and a benefit based on the fact that an external device has participated in the domain can be made available at the time of reissuing a license.

A reproducing device 1 transmits a request for reissuing the license for permitting the reproduction of the content in the domain, and participation information (S201). A server 2 receives the request for reissuing the license and the participation information (S202), and confirms validity of the transmitted participation information (S203). When the validity of the participation information is confirmed, the server 2 determines information on a specific privilege related to the license, transmits the information to the external device (S206), and reissues the license (S210).

6 Claims, 17 Drawing Sheets

FOREIGN PATENT DOCUMENTS

| | | |
|---|---|---|
| JP | 2002-197293 | 7/2002 |
| JP | 2004-62870 | 2/2004 |
| JP | 2004-110816 | 4/2004 |
| JP | 2004-145867 | 5/2004 |
| WO | WO-2004-023276 | 3/2004 |
| WO | WO-2004/030364 | 4/2004 |

OTHER PUBLICATIONS

"Partial European Search Report", mailed May 14, 2009 from EP Patent Office for corresponding EP Patent App. No. 08163197.0.

\* cited by examiner

F I G. 4
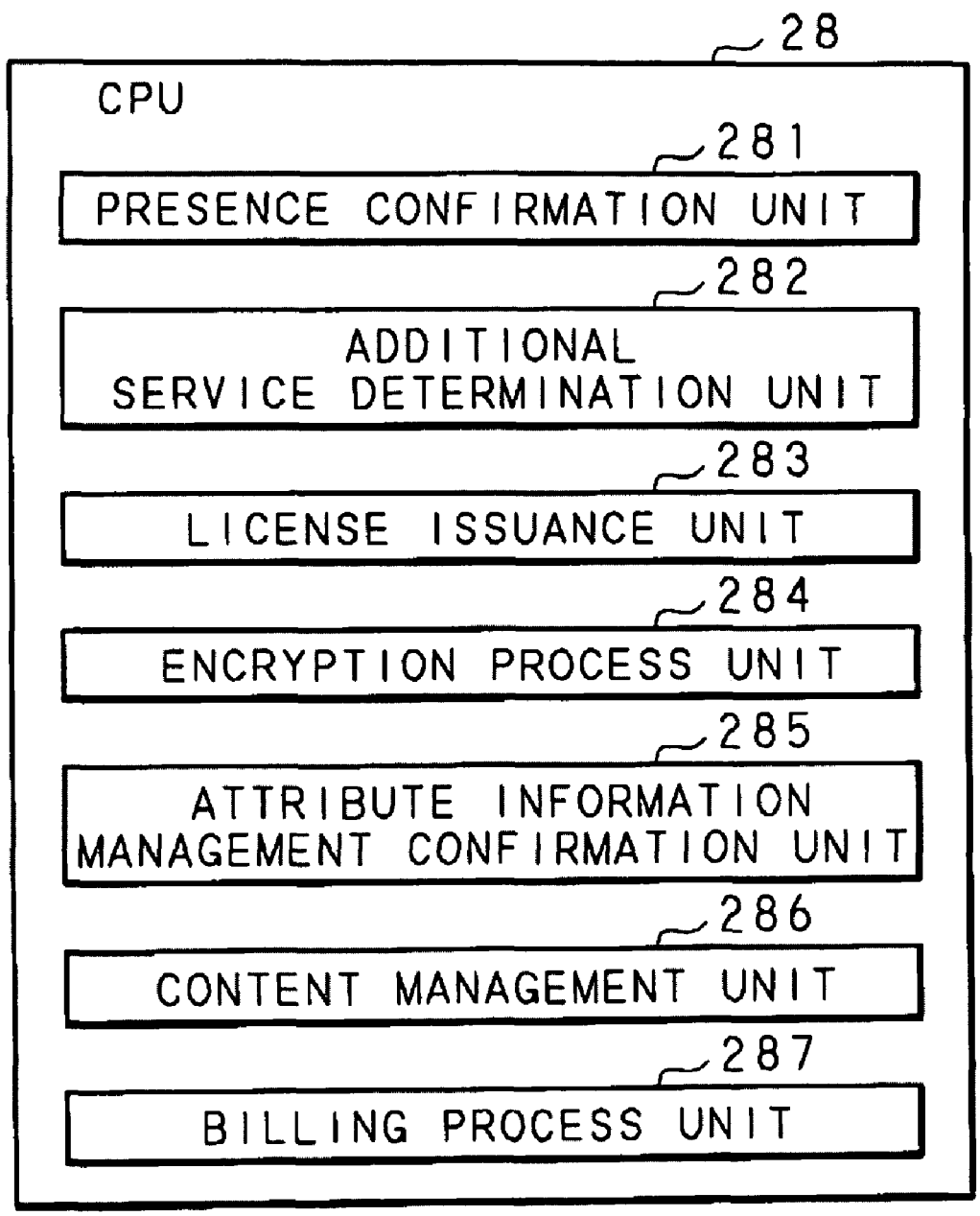

FIG. 5

| GROUP ID | DOMAIN ID | CONTENT ID | CONTENT KEY | AREA CONTROL |
|---|---|---|---|---|
| 500 | 1000 | 0001 | CKey1 | NONE |
|  |  | 0002 | CKey2 | NONE |
|  | 3000 | 0003 | CKey3 | NONE |
|  | 4000 | 0004 | CKey4 | NONE |
| 501 | 2000 | 0005 | CKey5 | ONLY JAPAN |
|  | 5000 | 0006 | CKey6 | ONLY JAPAN |
| ... | ... | ... | ... | ... |

F I G. 6

| DOMAIN ID | EXPIRATION DATA | ISSUER | NUMBER OF ISSUES |
|---|---|---|---|
| 2000 | 2010/9/14 | ××RECORD COMPANY | 1 CASE |
| 3000 | 2007/9/14 | ××RECORD COMPANY | 10,000 CASES |

| DOMAIN ID | EXPIRATION DATA | ISSUER | NUMBER OF ISSUES |
|---|---|---|---|
| 1000 | 2000/12/25 | ○○UNIVERSITY | 500 CASES |
| 2000 | 2010/12/25 | ○○UNIVERSITY | 1 CASE |
| 4000 | 2001/12/25 | ○○UNIVERSITY | 400 CASES |
| ⋮ | ⋮ | ⋮ | ⋮ |

F I G. 7
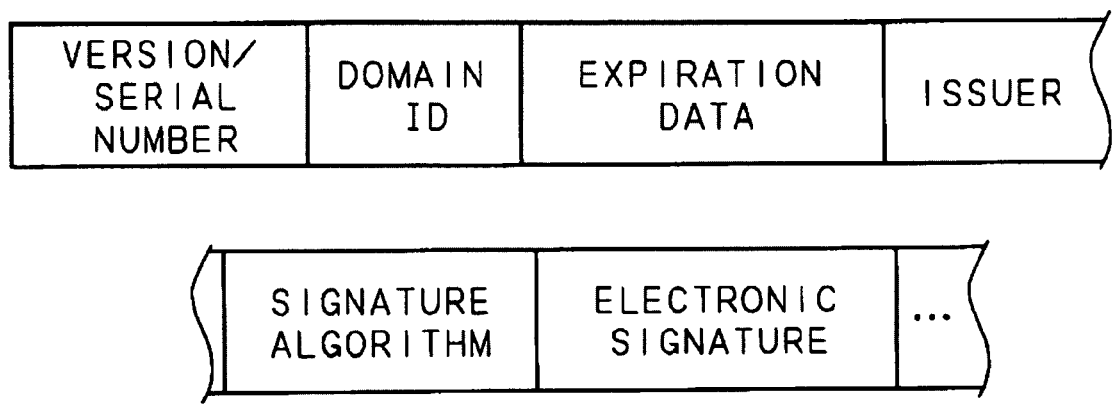

INFORMATION PROCESSING APPARATUS AND LICENSE DISTRIBUTION SYSTEM

CROSS-REFERENCE TO RELATED APPLICATION

This non-provisional application claims priority under 35 U.S.C. §119(a) on Patent Application No. 2007-318854 in Japan on Dec. 10, 2007, the entire contents of which are hereby incorporated by reference.

BACKGROUND

1. Technical Field

The present invention relates to an information processing apparatus and a license distribution system which transmit license information for permitting the reproduction of a content to a reproducing device participating in a domain, and relates to an information processing apparatus and a license distribution system which can offer a privilege related to a license in accordance with the participation of a reproducing device in a domain.

2. Description of Related Art

Conventionally, a content such as music, video, or images has been circulated as the digital content with high convenience which can be stored or duplicated with suppressed degradation. Accordingly, the digital content is used via a communication network such as the Internet or digital broadcasting, and distributed to many reproducing devices to be viewed or listened to.

To promote the circulation and frequent use of the digital content, there is proposed a system in which a privilege is offered in accordance with the use of the digital content such as, e.g., consecutively viewing or listening to a series content, or viewing or listening to a content in specific hours (for example, Japanese Laid-Open Patent Publication No. 2004-145867).

However, since the digital content has the problem of the piracy resulting from its easiness to duplicate, Digital Rights Management which requires permission by license when the digital content is viewed, listened to, or duplicated is essential.

To prevent the piracy, there is proposed a system in which a plurality of personal computers (hereinafter referred to as "PCs") or devices managed in, e.g., a home network are organized into one group, and each group is provided with a shared license so that the digital content can be viewed, listened to, or duplicated freely (for example, Japanese Laid-Open Patent Publication No. 2004-110816). Such a group is also termed a domain, and devices belonging to the domain share a domain key to implement the circulation of the content within the domain. As a result, unlimited spreading of the digital content can be prevented and the piracy by duplicating the digital content can be minimized.

Moreover, by providing a license to be given with a specific expiration date, unauthorized use of the content by using duplicated or altered license can be minimized.

SUMMARY

There is provided an information processing apparatus according to an aspect which outputs license information for permitting a reproduction of a content in a domain to a plurality of external devices, the plurality of external devices participating in the domain for managing, as one group, the plurality of external devices which can be authorized by an identical license, the information processing apparatus including: a database which stores key information sorted for each domain, for generating the license information, in association with at least domain identification information for identifying each domain, an expiration date which can be authorized by the identical license in each domain, and identification information of the content which is a target of permission by the identical license; and a communication unit which transmits participation information including the domain identification information and the expiration date to the external device, each time the external device participates in the domain, wherein the information processing apparatus receives the participation information together with a request for a license from the external device via the communication unit, the information processing apparatus further includes: a validity confirmation unit which confirms validity of the received participation information; and a privilege determination unit which determines a specific privilege related to the license when the validity of the received participation information is confirmed, and the information processing apparatus transmits the license information generated based on the key information corresponding to the domain identification information included in the received participation information and information on the determined specific privilege, to the external device via the communication unit.

Furthermore, there is provided a license distribution system according an aspect which comprises: a plurality of reproducing devices which reproduce contents, the plurality of reproducing devices participating in a domain for managing, as one group, the plurality of reproducing devices which are authorized by an identical license; and a license distribution device which can be connected to each of the reproducing devices, wherein the license distribution device manages the domain and outputs license information for permitting a reproduction of the content in the domain to the reproducing device, the license distribution device includes: a database which stores key information sorted for each domain, for generating the license information, in association with at least domain identification information for identifying each domain, an expiration date which can be authorized by the identical license in each domain, and identification information of the content which is a target of permission by the identical license; and a first communication unit which transmits participation information including the domain identification information and the expiration date to the reproducing device, each time the reproducing device participates in the domain; each of the reproducing devices includes: a second communication unit which receives the participation information transmitted by the license distribution device and transmits the received participation information together with a request for a license, the license distribution device receives the participation information transmitted by the reproducing device via the first communication unit, the license distribution device further includes: a validity confirmation unit which confirms validity of the received participation information; and a privilege determination unit which determines a specific privilege related to the license when the validity of the received participation information is confirmed, and the license distribution device transmits the license information generated based on the key information corresponding to the domain identification information included in the received participation information, and information on the determined specific privilege to the reproducing device via the first communication unit.

BRIEF DESCRIPTION OF THE SEVERAL VIEWS OF THE DRAWINGS

FIG. 4 is a block diagram for illustrating a function of a CPU;

FIG. 5 is a diagram showing an example of the storage of a content information table;

FIG. 6 is a diagram showing an example of the storage of a domain attribute information table;

FIG. 7 is a diagram showing a data structure of participation information;

DETAILED DESCRIPTION

In the above-mentioned Japanese Laid-Open Patent Publication No. 2004-145867, sufficient consideration is not given to copyright protection for contents.

In accordance with the above-mentioned Japanese Laid-Open Patent Publication No. 2004-110816, for example, a digital content which can be viewed or listened to in a university domain can not be viewed or listened to in a home domain. The convenience of the digital content should be utilized more effectively.

In addition, in accordance with the above-mentioned Japanese Laid-Open Patent Publication No. 2004-110816, a benefit based on the fact of previous participation in a domain can not be made available at the time of reacquiring a license. Accordingly, it is relatively difficult for a user to have an incentive to reacquire the license after the expiration date of the license.

An object is to provide an information processing apparatus and a license distribution system including the information processing apparatus which confirm validity of participation information in response to the reception of a request for a license for permitting the reproduction of a content in a domain and the participation information, determine a specific privilege information related to the license when the validity of the participation information is confirmed, and transmit the determined specific privilege information and the license information to an external device, whereby the reproduction or duplication of the content can be limited to the interior of the domain according to the presence or absence of the issuance of the license, and the benefit based on the fact that the external device has participated in the domain can be made available at the time of reissuing the license.

Embodiment 1

Figure 1:
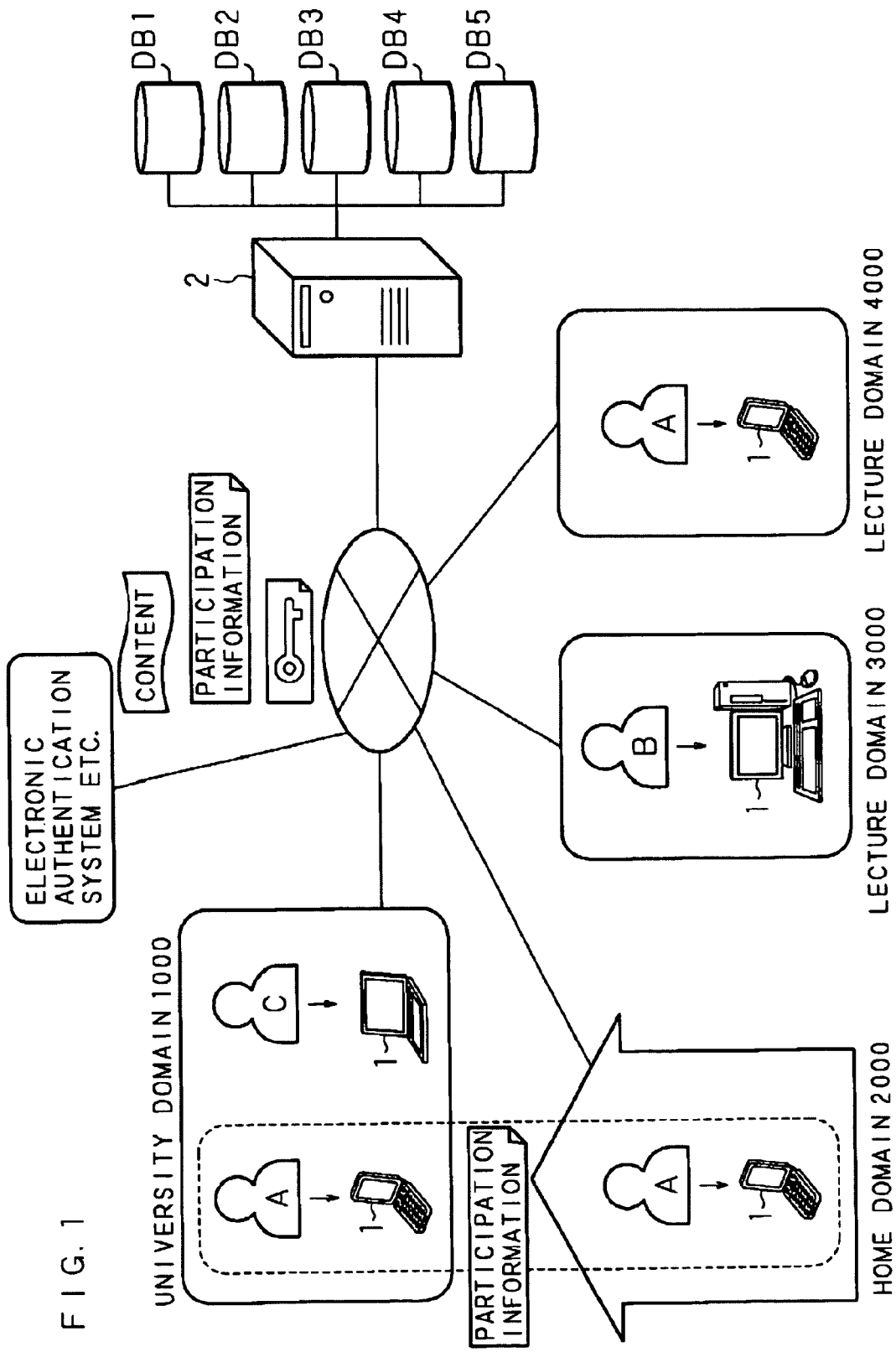
FIG. 1 is a schematic view showing an overall structure of a license distribution system according to a first embodiment.

A description will be given hereinbelow to an information processing apparatus and a license distribution system according to a first embodiment based on the drawings showing the embodiment. FIG. 1 is a schematic view showing the overall structure of the license distribution system according to the first embodiment.

As shown in FIG. 1, the license distribution system according to the first embodiment includes reproducing devices 1, 1, . . . , a server 2 connectable to each of the reproducing devices 1 via a communication network, a content information database DB1, a domain attribute information database DB2, a billing information database DB3, a license database DB4, and a content database DB5 each connected to the server 2. The license distribution system according to the first embodiment is also connectable to an external electronic authentication system or payment system via a communication network.

Each of the reproducing devices 1 is managed as part of a group in each domain. The domain is a concept for managing a plurality of reproducing devices 1, 1, . . . which are authorized by an identical license as one group. For example, it is possible to classify the group of the reproducing devices 1 managed by a router installed on a campus as a university domain 1000, classify the group of the reproducing devices 1 managed by a router installed at home as a home domain 2000, and classify the group of the reproducing devices 1 managed by a router installed at a lecture hall as a lecture domain 3000 and a lecture domain 4000. The server 2 can identify and manage each domain by identifying each router.

It is to be noted that it is not required to have a device for managing the reproducing devices 1 in each domain. All of the reproducing devices 1 and the domains may be managed by one server.

A description will be given to an example where a user A participates in a specific domain at a specific time. When the reproducing device 1 of the user A participates in the university domain 1000 and acquires a content for a lecture, the procedure shown below is performed.

When the server 2 receives a request for participation in the university domain 1000 transmitted from the reproducing device 1 of the user A, the server 2 transmits participation information including a domain ID of the university domain 1000, a domain key, and the expiration date of a license to the reproducing device 1 of the user A.

The reproducing device 1 of the user A receives the participation information, and transmits a request for acquiring the content to the server 2.

The server 2 receives the request for acquiring the content. The server 2 then encrypts the content using the content key, and transmits the encrypted content to the reproducing device 1 of the user A. The server 2 also transmits the license which is encrypted using the domain key corresponding to the university domain 1000 and which includes the content key to the reproducing device 1 of the user A.

The reproducing device 1 of the user A receives the encrypted content and license. The reproducing device 1 of the user A acquires the license by decrypting the encrypted license using the domain key, decrypts the encrypted content using the license, and reproduces the decrypted content in response to an instruction for reproducing the content inputted by the user A. That is, in accordance with the license, there is a case where the content can be freely reproduced, where the number of times of reproduction is limited, or where the expiration date is set in the reproducing device 1 of the user A.

The validity of the participation information is confirmed by using a PKI (Public Key Infrastructure) of an external electronic authentication system.

When the reproducing device 1 of the user A reproduces at home, e.g., the content acquired in the university domain 1000 after the expiration date for the license thereof, it is necessary to reacquire the license acquired in the university domain 1000. The reproducing device 1 of the user A receives the request for reissuing the license inputted by the user A, and transmits the participation information acquired in the university domain 1000 together with the received request for reissuing the license to the server 2.

The server 2 receives the request for reissuing the license and the participation information, and confirms the validity of the received participation information. The confirmation of the validity of the participation information is performed e.g., by requesting the external electronic authentication system to verify an issuer's signature in the participation information, or by verifying whether or not the combination of the domain ID and the expiration date for the license in the participation information is stored in the domain attribute information database DB2. When the validity of the participation information is confirmed, the server 2 determined a specific privilege related to the license such as a discount on a license fee for the user A, and transmits the determined privilege information to the reproducing device 1 of the user A.

The reproducing device 1 of the user A receives the privilege information. After the user A settles the payment for the license fee using the external payment system, the reproducing device 1 of the user A transmits a settlement notification to the server 2.

It is to be noted that the server 2 may directly request the settlement of the payment of the license fee using the payment system and acquire the settlement notification without the intervention of the user A.

The server 2 receives the settlement notification and reissues the license to the reproducing device 1 of the user A.

When the validity of the received participation information is not confirmed, the server 2 requests a regular license fee from the user A.

When the license acquired in the university domain 1000 is not expired, the server 2 reissues the license with no charge.

When the reproducing device 1 participates in the home domain 2000 and requests the acquisition of the content encrypted for the home domain 2000, the reproducing device 1 of the user A transmits the ID of the home domain 2000 and the request for participation to the server 2, while the server 2 encrypts the content using the content key and transmits the encrypted content to the reproducing device 1 of the user A.

Figure 2:
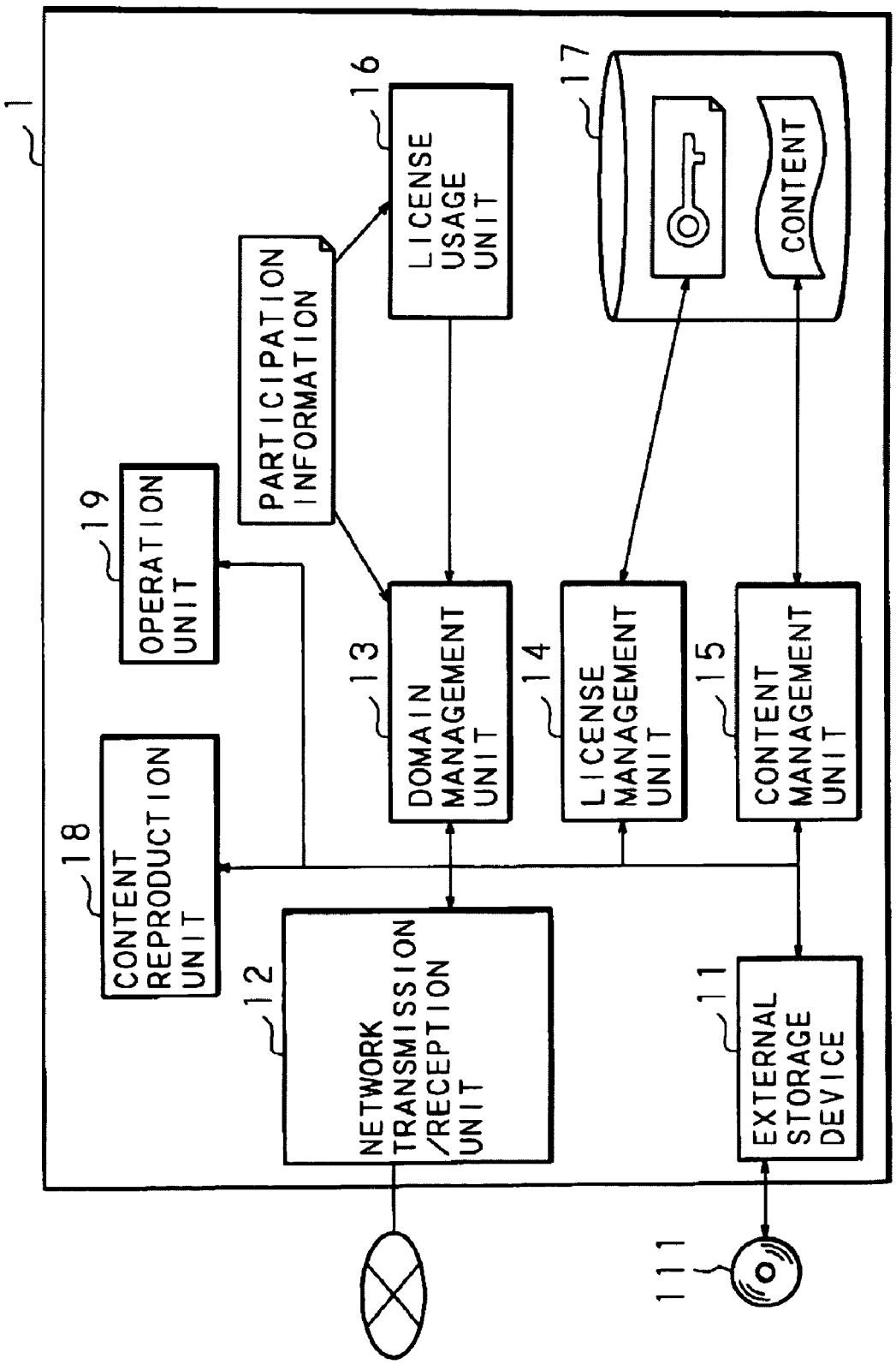
FIG. 2 is a block diagram for illustrating a function of a reproducing device.

Next, a description will be given to the structure and the function of each of the reproducing devices 1. FIG. 2 is a block diagram for illustrating the function of the reproducing device 1. The reproducing device 1 includes, e.g., a PC, a mobile phone, or a PDA (Personal Digital Assistant) having communication and content reproducing functions. The reproducing device 1 includes an external storage device 11, a network transmission/reception unit 12, a domain management unit 13, a license management unit 14, a content management unit 15, a license usage unit 16, an auxiliary storage device 17, a content reproduction unit 18, and an operation unit 19. The individual hardware devices are connected to each other via a signal line (not shown).

The external storage device 11 is a device for reading a program or various data recorded in a recording medium 111. When the recording medium 111 is inserted into an insertion opening (not shown), the external storage device 11 reads the program or various data recorded in the inserted recording medium 111, and outputs the read program or various data to the domain management unit 13, the license management unit 14, or the content management unit 15. The external storage device 11 reads, e.g., content data recorded in the recording medium 111 and outputs the data to the auxiliary storage device 17.

In addition, the external storage device 11 is a device for recording various data in the recording medium 111. The external storage device 11 reads, e.g., content data stored in the auxiliary storage device 17 and records the data in the recording medium 111.

The network transmission/reception unit 12 is a terminal end of a communication network, and functions as the contact for performing communication with another reproducing device 1, the server 2, external systems, or the like via the communication network. The communication network includes, e.g., the Internet, an intranet, an extranet, a LAN, an ISDN, a VAN, a CATV network, Virtual Private Network, a telephone communication network, a mobile communication network, a satellite communication network, and the like.

The network transmission/reception unit 12 outputs information received from the outside to the domain management unit 13, the license management unit 14, or the content management unit 15. The network transmission/reception unit 12 further transmits information received from the domain management unit 13, the license management unit 14, or the content management unit 15 to the outside.

The domain management unit 13 receives the participation information transmitted from the server 2 via the network transmission/reception unit 12, and retains the received participation information. In addition, the domain management unit 13 outputs the retained participation information to the license usage unit 16, and receives the result determined in the license usage unit 16. The domain management unit 13 then notifies the user of the received result. When the domain management unit 13 receives the input of the request for reissuing the license via the operation unit 19, the domain management unit 13 transmits the retained participation information and the request for reissuing the license to the server 2.

The license management unit 14 receives the license information or the like transmitted from the server 2, and stores the received license information in the auxiliary storage device 17.

When the license management unit 14 receives the input of an instruction for reproducing the content via the operation unit 19, the license management unit 14 reads the license information stored in the auxiliary storage device 17 and outputs the license information to the content reproduction unit 18.

The content management unit 15 transmits the request for acquiring the content to the server 2.

The content management unit 15 receives the content transmitted from the server 2, and stores the received content in the auxiliary storage device 17.

When the content management unit 15 receives the input of the instruction for reproducing the content via the operation unit 19, the content management unit 15 reads the content stored in the auxiliary storage device 17, and outputs the content to the content reproduction unit 18.

The license usage unit 16 receives the participation information outputted from the domain management unit 13, determines whether or not the license included in the received participation information is expired, and outputs the determination result to the domain management unit 13.

The auxiliary storage device 17 receives and stores the license information outputted from the license management unit 14, reads the stored license information as necessary, and outputs the information to the license management unit 14. The auxiliary storage device 17 receives and stores the content outputted from the content management unit 15, reads the stored content as necessary, and outputs the content to the content management unit 15.

The content reproduction unit 18 includes, e.g., a liquid crystal display device, a speaker, or the like. When the content reproduction unit 18 receives the input of the instruction for reproducing the content via the operation unit 19, the content reproduction unit 18 decrypts the content based on the license information, and reproduces the decrypted content.

The operation unit 19 receives various instructions or requests inputted by the user, and outputs the received instructions or requests to individual hardware devices.

Figure 3:
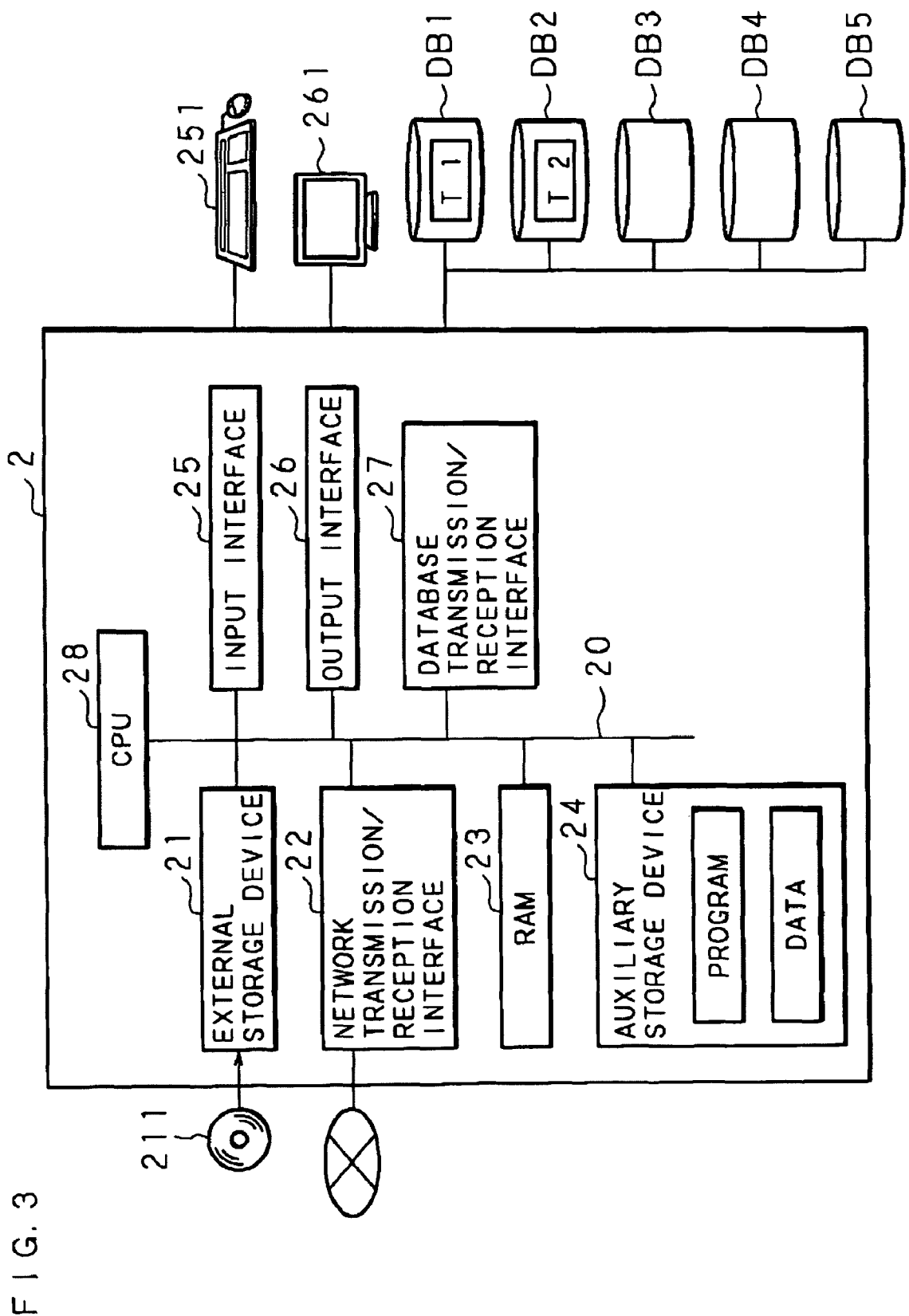
FIG. 3 is a block diagram showing a structure of a server.

Next, the structure and function of the server 2 will be described. FIG. 3 is a block diagram showing the structure of the server 2, while FIG. 4 is a block diagram for illustrating the function of a CPU 28. The server 2 includes an external storage device 21, a network transmission/reception interface 22, a RAM 23, an auxiliary storage device 24, an input interface 25, an output interface 26, a database transmission/reception interface 27, and the CPU 28. Individual hardware devices are connected to each other via a bus 20.

The external storage device 21 is a device for reading a program or various data recorded in a recording medium 211. When the recording medium 211 is inserted into an insertion opening (not shown), the external storage device 21 reads the program or various data recorded in the inserted recording medium 211, and outputs the read program or various data to the auxiliary storage device 24.

The network transmission/reception interface 22 is the terminal end of the communication network, and functions as the contact for performing communication with the reproducing device 1 or the external systems via the communication network. The communication network includes, e.g., the Internet, the intranet, the extranet, the LAN, the ISDN, the VAN, the CATV network, Virtual Private Network, the telephone communication network, the mobile communication network, the satellite communication network, and the like.

The RAM 23 is a main storage device capable of storing a plurality of information items and reading the information items irrespective of the order and the positions in which they are stored. The RAM 23 stores, e.g., a program stored in the auxiliary storage device 24, various data generated by performing the program, and various information received from the outside, and reads the stored program, various data, or various information in response to a read instruction from the CPU 28.

The auxiliary storage device 24 includes, e.g., a magnetic-storage hard disk. The auxiliary storage device 24 stores a program and data for causing the server 2 to execute a license distribution process. The auxiliary storage device 24 reads the stored program or data in response to the read instruction from the CPU 28.

The input interface 25 is connected to an input device 251. The input device 251 includes, e.g., a keyboard, a mouse, or the like. The input device 251 is operated by a server manager and is used to input various instructions for the maintenance and management of the server 2 or the license distribution.

The input interface 25 receives various instructions inputted via the input device 251, and outputs the received various instructions to the CPU 28.

The output interface 26 is connected to an output device 261. The output device 261 includes, e.g., the liquid crystal display device or the like. The output device 261 is used to output various instructions for the maintenance and management of the server 2 or the license distribution. The output interface 26 outputs information for the maintenance and management of the server 2 or the license distribution to the output device 261.

The database transmission/reception interface 27 functions as the contact for the connection with the content information database DB1, the domain attribute information database DB2, the billing information database DB3, the license database DB4, and the content database DB5.

The CPU 28 executes the license distribution process by controlling each of the hardware devices in the server 2. The procedure for the license distribution process executed by the CPU 28 will be described later. The CPU 28 has functions as a presence confirmation unit 281, an additional service determination unit 282, a license issuance unit 283, an encryption process unit 284, an attribute information management confirmation unit 285, a content management unit 286, and a billing process unit 287.

The presence confirmation unit 281 confirms the validity of the participation information. The presence confirmation unit 281 confirms the validity of the participation information e.g., by requesting the external electronic authentication system to authenticate an issuer's signature included in the participation information to receive the result, or verifying whether or not the combination of the domain ID and the expiration date for the license in the participation information is stored in the domain attribute information database DB2. The presence confirmation unit 281 outputs the confirmation result to the additional service determination unit 282.

When the validity of the participation information is confirmed, the additional service determination unit 282 determines the specific privilege related to the license and outputs the determined specific privilege information to the billing process unit 287. The specific privilege is determined, e.g., by offering a flat discount rate of 20 percent on the fee of the license to be reissued, or on the basis of a discount rate according to consecutive participation in the domain, or on the basis of a discount rate according to the number of participants in the domain.

The license issuance unit 283 receives the content key and the content ID outputted from the encryption process unit 284, generates the license information based on the received content key, sorts the generated license information for each content ID, and stores the license information in the license database DB4. When the license issuance unit 283 receives an instruction for issuing the license outputted from the billing process unit 287, the license issuance unit 283 extracts the license information stored in the license database DB4, and transmits the extracted license information to the reproducing device 1 via the network transmission/reception interface 22. In addition, the license issuance unit 283 refers to the number of issues of the participation information in a domain attribute information table T2 to manage the number of issues in the domain.

The encryption process unit 284 extracts the content key from the content information database DB1 and encrypts the content using the extracted content key. The encryption process unit 284 outputs the content key and the content ID to the license issuance unit 283, and transmits the encrypted content to the reproducing device 1 via the network transmission/reception interface 22.

The attribute information management confirmation unit 285 extracts the expiration date and the like from the domain attribute information database DB2, and generates the participation information. The attribute information management confirmation unit 285 transmits the generated participation information to the reproducing device 1 via the network transmission/reception interface 22.

The content management unit 286 extracts the content key and the like from the content information database DB1 and transmits them to the encryption process unit 284.

The billing process unit 287 receives the specific privilege information outputted from the additional service determination unit 282, and stores the received privilege information in the billing information database DB3, while at the same time transmitting the privilege information to the reproducing device 1 via the network transmission/reception interface 22. When the billing process unit 287 receives the settlement notification transmitted from the reproducing device 1, the billing process unit 287 then outputs an issuance instruction to the license issuance unit 283.

Next, a description will be given to an example of the storage of a content information table T1 in the content information database DB1. FIG. 5 shows the example of the storage of the content information table T1. In the content information table T1, information related to the content reproducible in the domain is sorted and stored for each domain ID. The information related to the content includes a group ID, the content ID for identifying the content, the content key for encrypting the content, and an area control for limiting an area where the content can be reproduced. The group ID defines domains denoted by a plurality of domain IDs as domains belonging to one group. The information related to the content is preset by a system manager.

Next, a description will be given to an example of the storage of a domain attribute information table T2 in the domain attribute information database DB2. FIG. 6 shows the example of the storage of the domain attribute information table T2. In the domain attribute information table T2, information related to the license issued in the domain is sorted for each domain ID and stored. The information related to the license includes the expiration date of the license, the issuer of the participation information, and the number of issues of the participation information.

Next, a data structure of the participation information will be described. FIG. 7 shows the data structure of participation information. In the data structure of participation information, a version/serial number, the domain ID, the expiration date of the license, the issuer of the participation information, a signature algorithm, an electronic signature, and the like are included. The version/serial number, the domain ID, and the expiration date of the license are preset by the system manager. The issuer of the participation information is used to confirm the validity of the participation information. The signature algorithm and the electronic signature are issued from the external electronic authentication system when the participation information is generated, and used to confirm the validity of the participation information.

Figure 8:
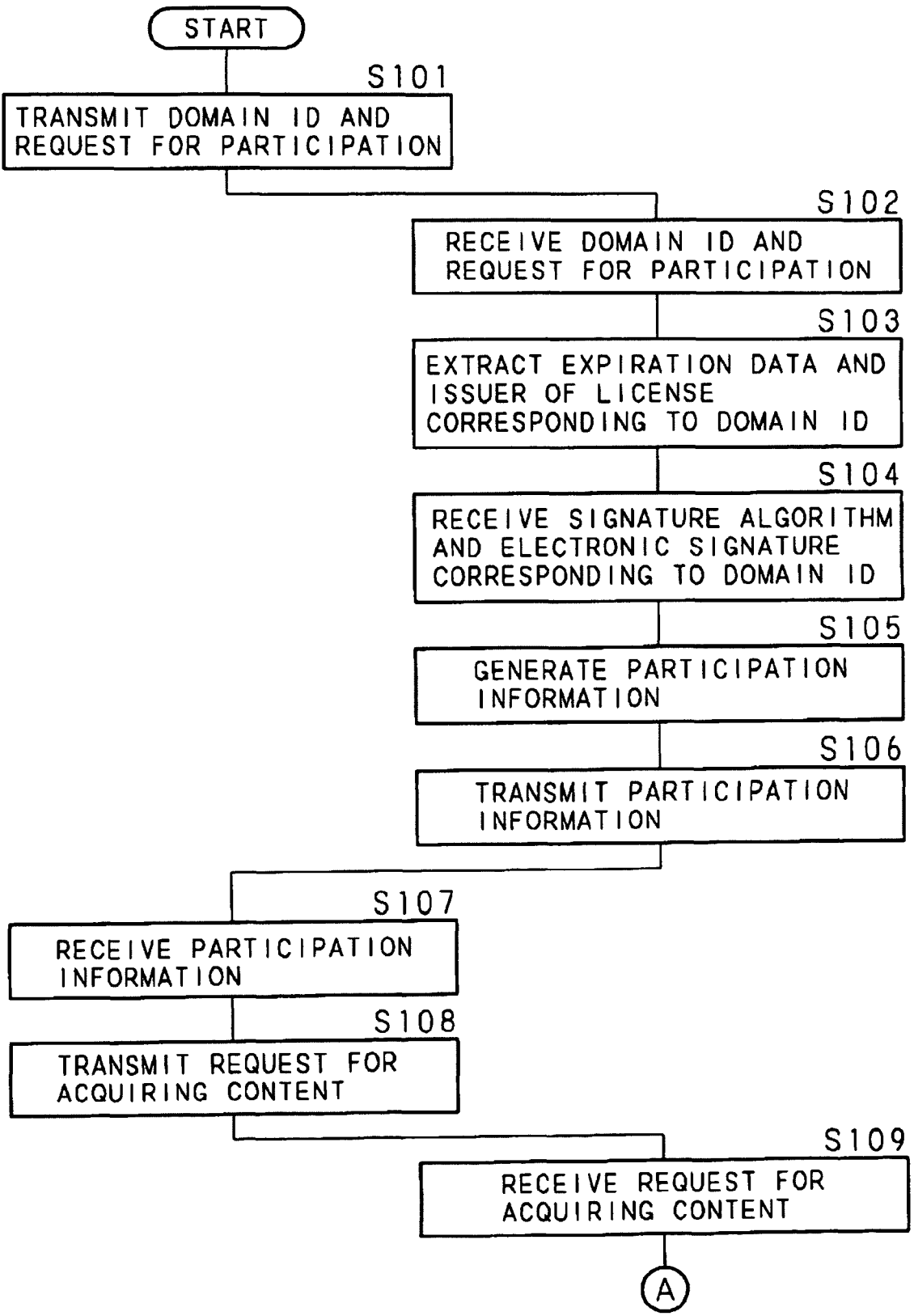
FIG. 8 is an operation flow showing a procedure for a license distribution process at the time of participating in a domain.
Figure 9:
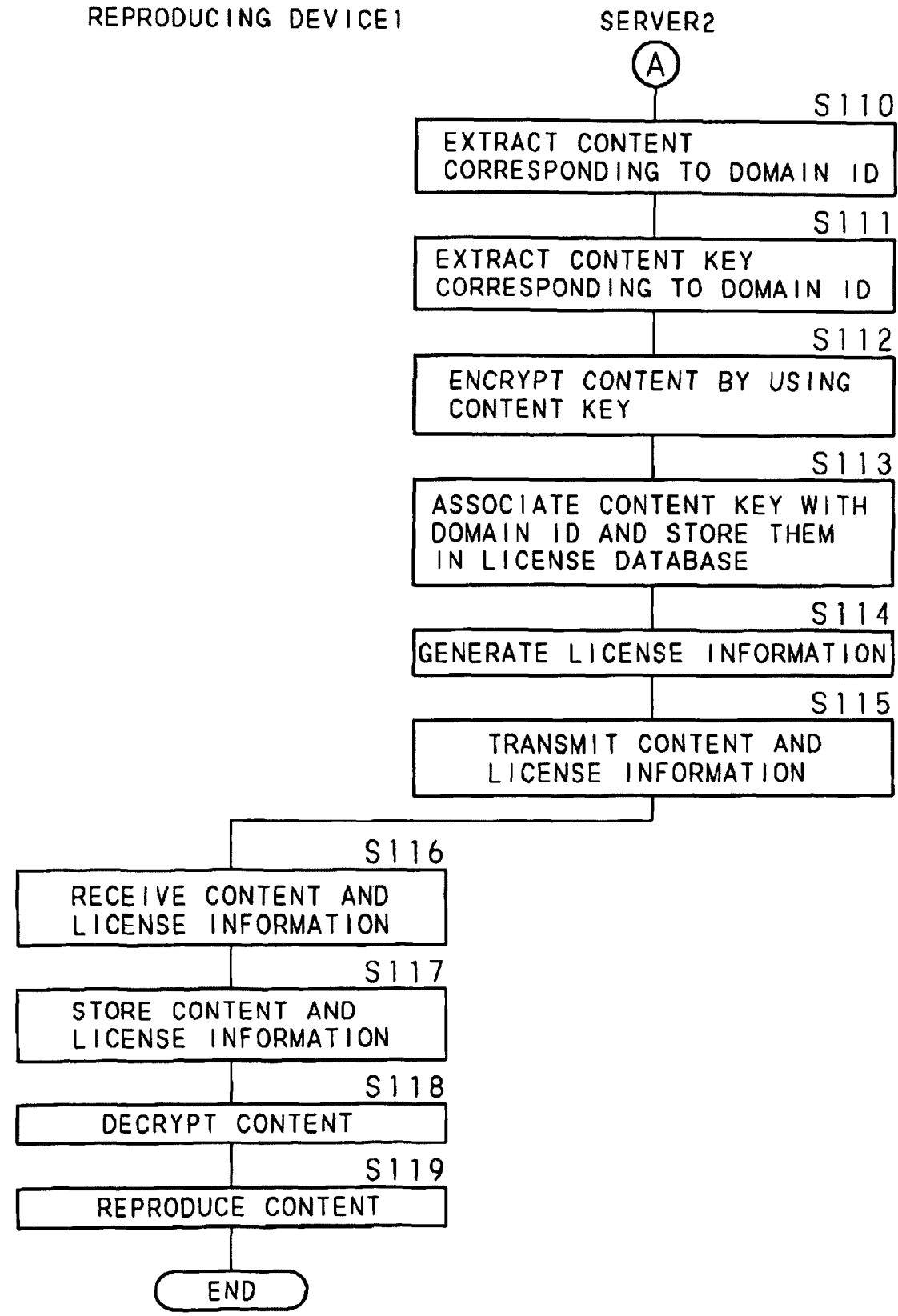
FIG. 9 is the operation flow showing the procedure for the license distribution process at the time of participating in the domain.

Next, a description will be given to the procedure for the license distribution process at the time of participating in the domain. FIGS. 8 and 9 illustrate an operation flow showing the procedure for the license distribution process at the time of participating in the domain.

To cause the reproducing device 1 to participate in the university domain 1000, the user A inputs the domain ID in which the reproducing device is to participate and the request for participation via the operation unit 19. The reproducing device 1 of the user A receives the domain ID and the request for participation inputted by the user A and transmits the received domain ID and the request for participation to the server 2 (S101).

The CPU 28 of the server 2 receives the domain ID and the request for participation transmitted from the reproducing device 1 (S102). The CPU 28 makes an access to the domain attribute information database DB2, and extracts the expiration date and the issuer of a license corresponding to the received domain ID (S103). The CPU28 receives a signature algorithm and an electronic signature each corresponding to the domain ID from the external electronic authentication system (S104). The CPU 28 generates the participation information including the domain ID, the expiration date of the license, the issuer, the signature algorithm, and the electronic signature (S105), and transmits the generated participation information to the reproducing device 1 of the user A (S106).

The reproducing device 1 of the user A receives the participation information (S107), and transmits the request for acquiring the content to the server 2 (S108).

The CPU 28 of the server 2 receives the request for acquiring the content (S109), and makes an access to the content database DB5 to extract the content corresponding to the domain ID (S110). The CPU 28 makes an access to the content information database DB1 to extract the content key corresponding to the domain ID (S111), and encrypts the content by using the extracted content key (S112). The CPU 28 associates the content key with the domain ID and stores them in the license database DB4 (S113). The CPU 28 generates the license information based on the content key (S114). The CPU 28 transmits the encrypted content and the generated license information to the reproducing device 1 (S115).

It is to be noted that the place from which the encrypted content is acquired is not limited to the server 2. In the case where another reproducing device 1 has already acquired the encrypted content in the identical domain, the encrypted content may be acquired from another reproducing device 1 in the identical domain.

The reproducing device 1 of the user A receives the encrypted content and the license information (S116), and stores the received content and license information in the auxiliary storage device 17 (S117). The reproducing device 1 of the user A decrypts the content using the license information in response to the request for reproducing the content inputted by the user A (S118), and reproduces the decrypted content (S119). Subsequently, the reproducing device 1 and the server 2 end the license distribution process at the time of participating in the domain.

Figure 10:
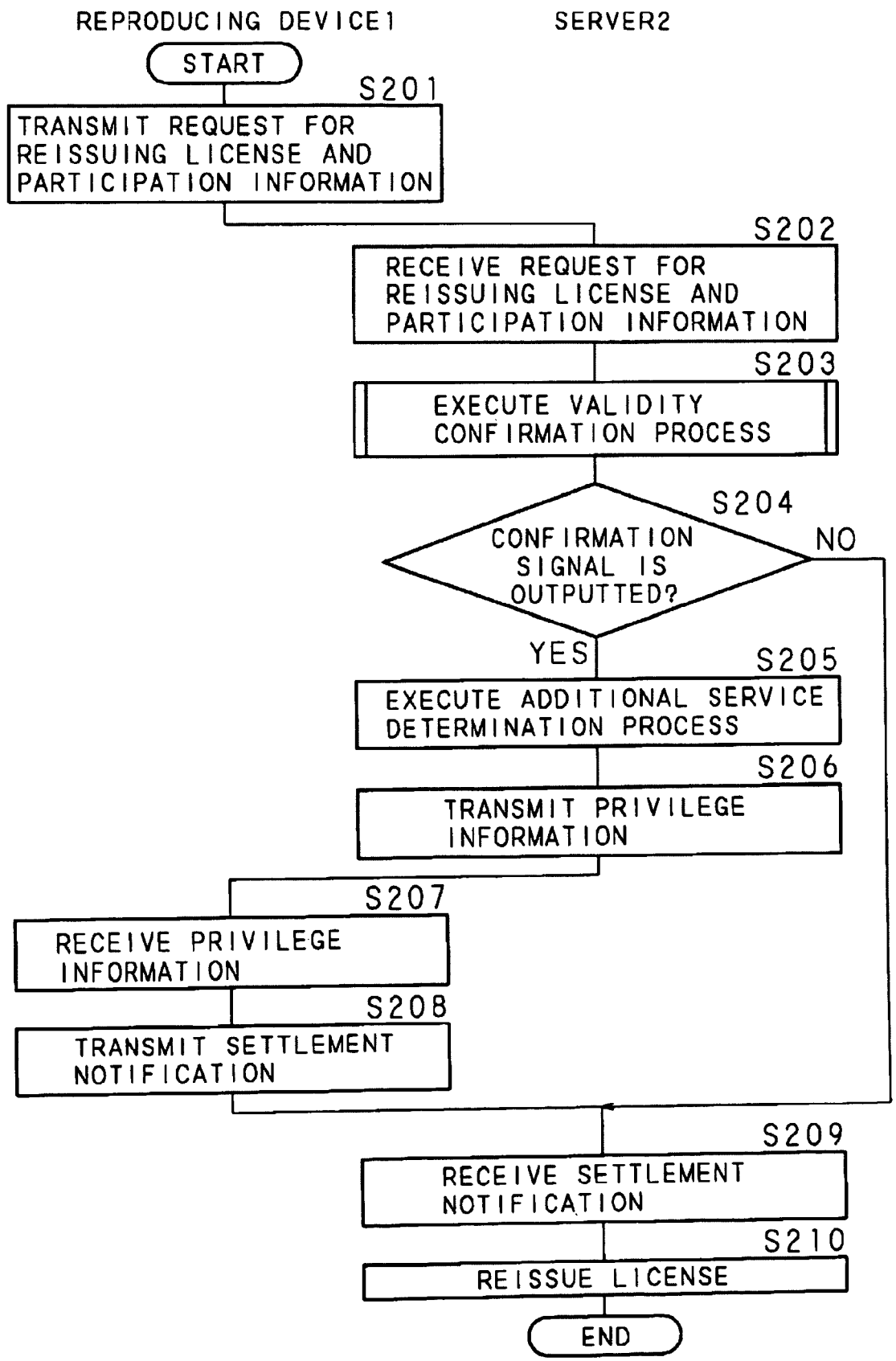
FIG. 10 is an operation flow showing a procedure for the license distribution process after an expiration date.

Next, a description will be given to the procedure for the license distribution process after the expiration date. FIG. 10 illustrates an operation flow showing the procedure for the license distribution process after the expiration date.

The user A inputs the request for reissuing the license via the operation unit 19 in order to view or listen to, e.g., the acquired content in the reproducing device 1 after the expiration date. The reproducing device 1 of the user A receives the request for reissuing the license and transmits the received request for reissuing the license and the retained participation information to the server 2 (S201).

The CPU 28 of the server 2 receives the request for reissuing the license and the participation information (S202), and executes a validity confirmation process (S203). The CPU 28 determines whether or not a confirmation signal is outputted by the validity confirmation process (S204). As a result, when the CPU 28 determines that the confirmation signal is not outputted (NO in S204), the user A settles the payment of a regular license fee with the external payment system without being offered the privilege information. The CPU 28 receives the settlement notification, which indicates the completion of the payment of the regular license fee, transmitted from the reproducing device 1 of the user A (S209), and reissues the license (S210). Then the reproducing device 1 and the server 2 end the license distribution process after the expiration date.

Conversely, when the CPU 28 determines that the confirmation signal is outputted (YES in S204), the CPU 28 executes an additional service determination process (S205), and transmits the privilege information determined by the process to the reproducing device 1 (S206). The CPU 28 statically determines an additional service such as, e.g., a flat 20 percent discount on the fee of the license to be reissued in the additional service determination process.

The reproducing device 1 of the user A receives the privilege information (S207). After the user A settles the payment of the license fee discounted by the privilege information with the external payment system, the reproducing device 1 of the user A transmits the settlement notification indicative of the completion of the payment of the license fee to the server 2 (S208).

The CPU 28 of the server 2 receives the settlement notification (S209), and reissues the license (S210). Then the reproducing device 1 and the server 2 end the license distribution process after the expiration date.

Figure 11:
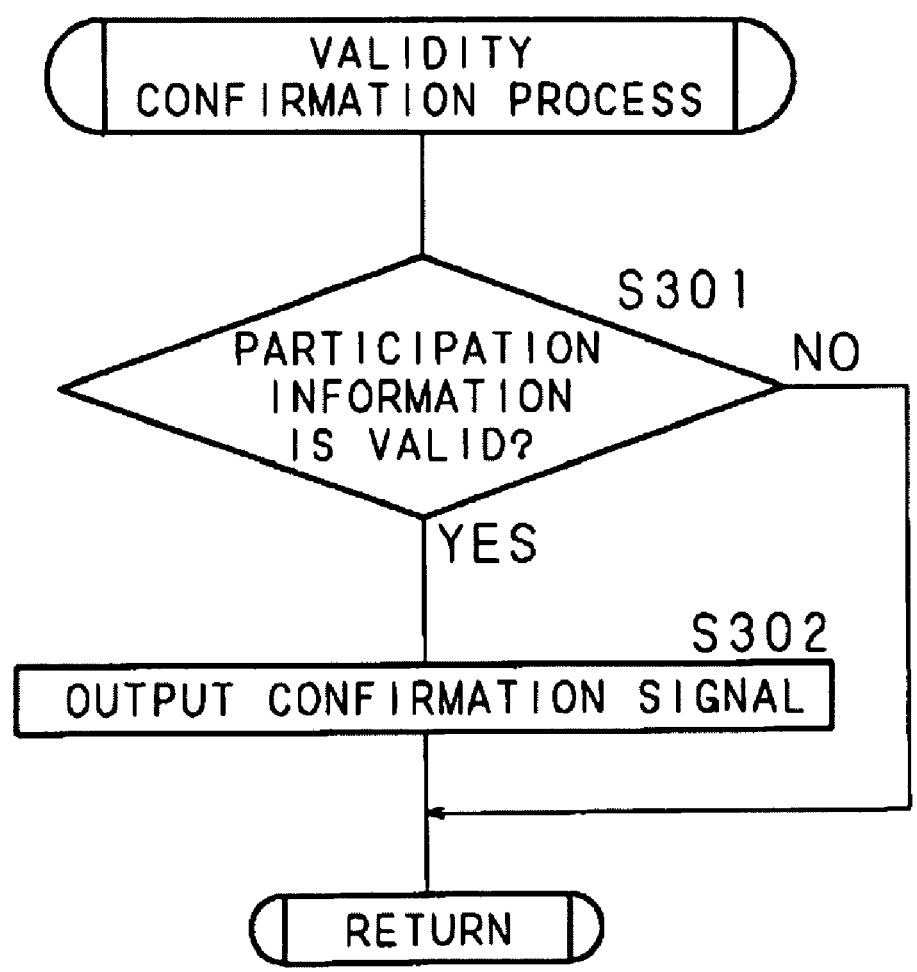
FIG. 11 is an operation flow showing a procedure for a validity confirmation process according to the first embodiment.

Next, a description will be given to the validity confirmation process executed by the CPU 28 in the operation S203. FIG. 11 illustrates an operation flow showing the validity confirmation process according to the first embodiment.

The CPU 28 of the server 2 determines whether or not the participation information received from the reproducing device 1 of the user A is valid (S301). As a result, when it is determined that the received participation information is not valid (NO in S301), the CPU 28 does not output the confirmation signal and suspends the validity confirmation process until the next execution.

Conversely, when it is determined that the received participation information is valid (YES in S301), the CPU 28 outputs the confirmation signal (S302) and suspends the validity confirmation process until the next execution.

Thus, the user A can gain the benefit based on the fact of having participated in the domain at the time of reissuing the license in said domain so that the user A is offered a discount on the fee required for reissuing the license.

Embodiment 2

The foregoing first embodiment has described an example where the content is reproducible in any area without limiting the area where the content can be reproduced. However, the present technology is not limited to the embodiment. For example, the area where the content is reproducible may be limited.

In a second embodiment, each reproducing device 1 further comprises a Global Positioning System (GPS) unit capable of detecting the position thereof. Since the structure and the function of the GPS unit are well known, the description thereof will be omitted.

Figure 12:
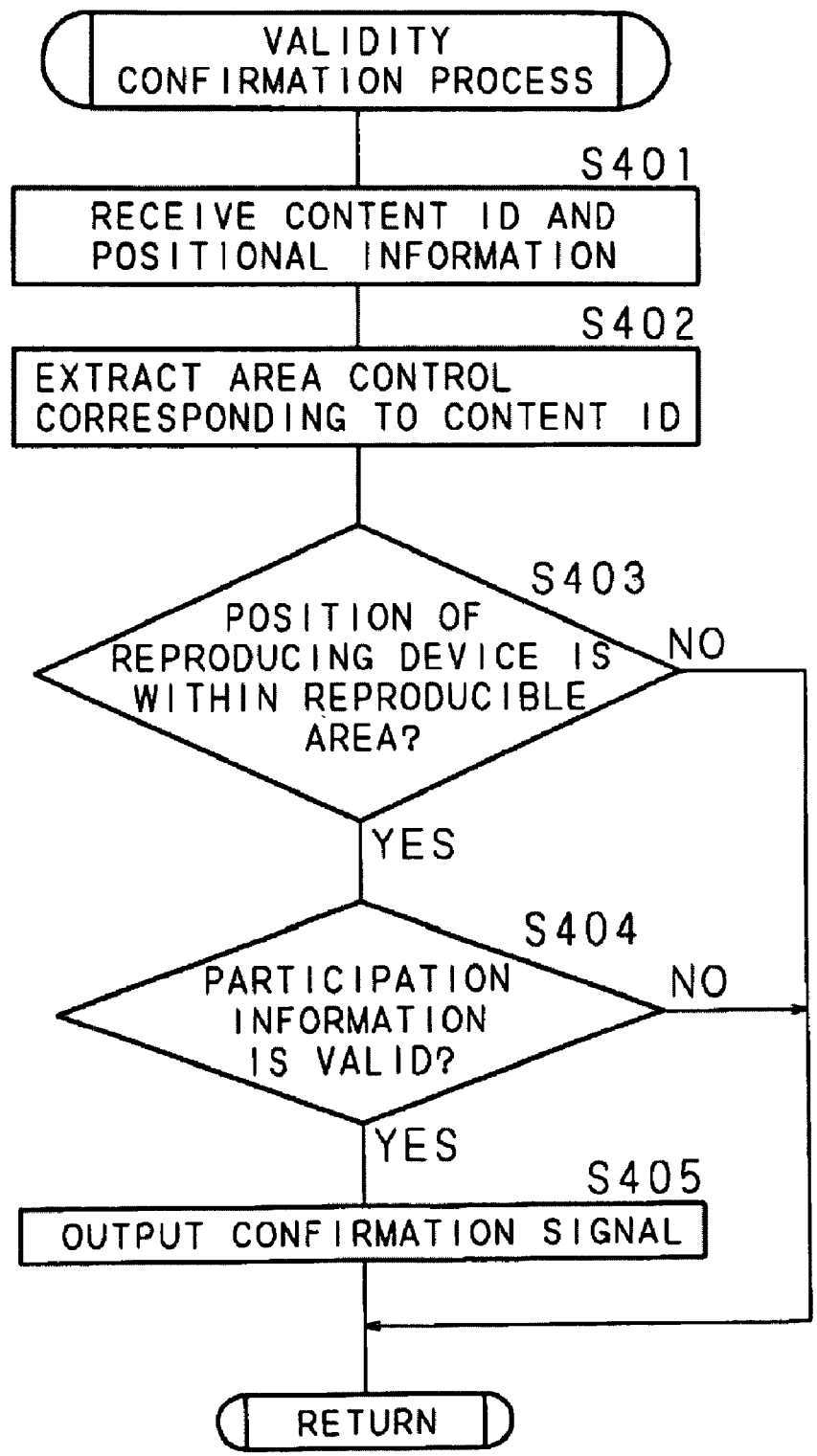
FIG. 12 is an operation flow showing a procedure for a validity confirmation process according to a second embodiment.

Next, a description will be given to the procedure for a validity confirmation process executed by the CPU 28. FIG. 12 illustrates an operation flow showing the procedure for the validity confirmation process according to the second embodiment.

The CPU 28 of the server 2 requests the ID of the content to be viewed or listened to and positional information on the reproducing device 1 from the reproducing device 1 of the user A. The reproducing device 1 of the user A detects the position thereof using the GPS unit in response to the request from the server 2, and transmits the detected positional information and the ID of the content to be viewed or listened to, to the server 2.

The CPU 28 of the server 2 receives the content ID and the positional information transmitted from the reproducing device 1 of the user A (S401). The CPU 28 makes an access to the content information database DB1 to extract an area control corresponding to the received content ID (S402). Then the CPU 28 determines whether or not the position of the reproducing device 1 of the user A is within the content-reproducible area based on the extracted area control (S403). When it is determined that the position of the reproducing device 1 of the user A is not within the content-reproducible area (NO in S403), the CPU 28 does not output a confirmation signal and suspends the validity confirmation process until the next execution.

Conversely, when it is determined that the position of the reproducing device 1 of the user A is within the content-reproducible area (YES in S403), the CPU 28 determines whether or not the received participation information is valid (S404). When it is determined that the received participation information is not valid (NO in S404), the CPU 28 does not output the confirmation signal and suspends the validity confirmation process until the next execution.

Conversely, when it is determined that the received participation information is valid (YES in S404), the CPU 28 outputs the confirmation signal (S405) and suspends the validity confirmation process until the next execution.

As for other structure, function, and process procedure, they are the same as described in the first embodiment so that the descriptions thereof will be omitted by using like reference numerals to designate corresponding parts.

By thus performing the control for limiting the content-reproducible area, the content-reproducible area can be limited to, e.g., Japan so that the content distributed overseas can not be reproduced, thereby giving consideration to the copyright protection for the content.

It is to be noted that the control for limiting the content-reproducible area according to the second embodiment may be executed before an operation for confirming the validity of the participation information in an embodiment described later.

Embodiment 3

The foregoing embodiments have described an example where the license is reissued based on the fact that the reproducing device 1 of the user A has participated in the university domain 1000. However, the present technology is not limited to these embodiments. For example, by considering the fact that the reproducing device 1 of the user A has participated in the lecture domain 4000 in addition to the fact that it has participated in the university domain 1000, the license may be reissued based on participation information items in a plurality of domains. That is, when it can be determined that one domain and another domain can be defined as domains belonging to the identical group (see FIG. 5), the reproducing device may gain the benefit based on the fact of having participated in a plurality of domains. In addition, specific privilege information may be determined in accordance with a participation history showing the participation in a plurality of domains.

Figure 13:
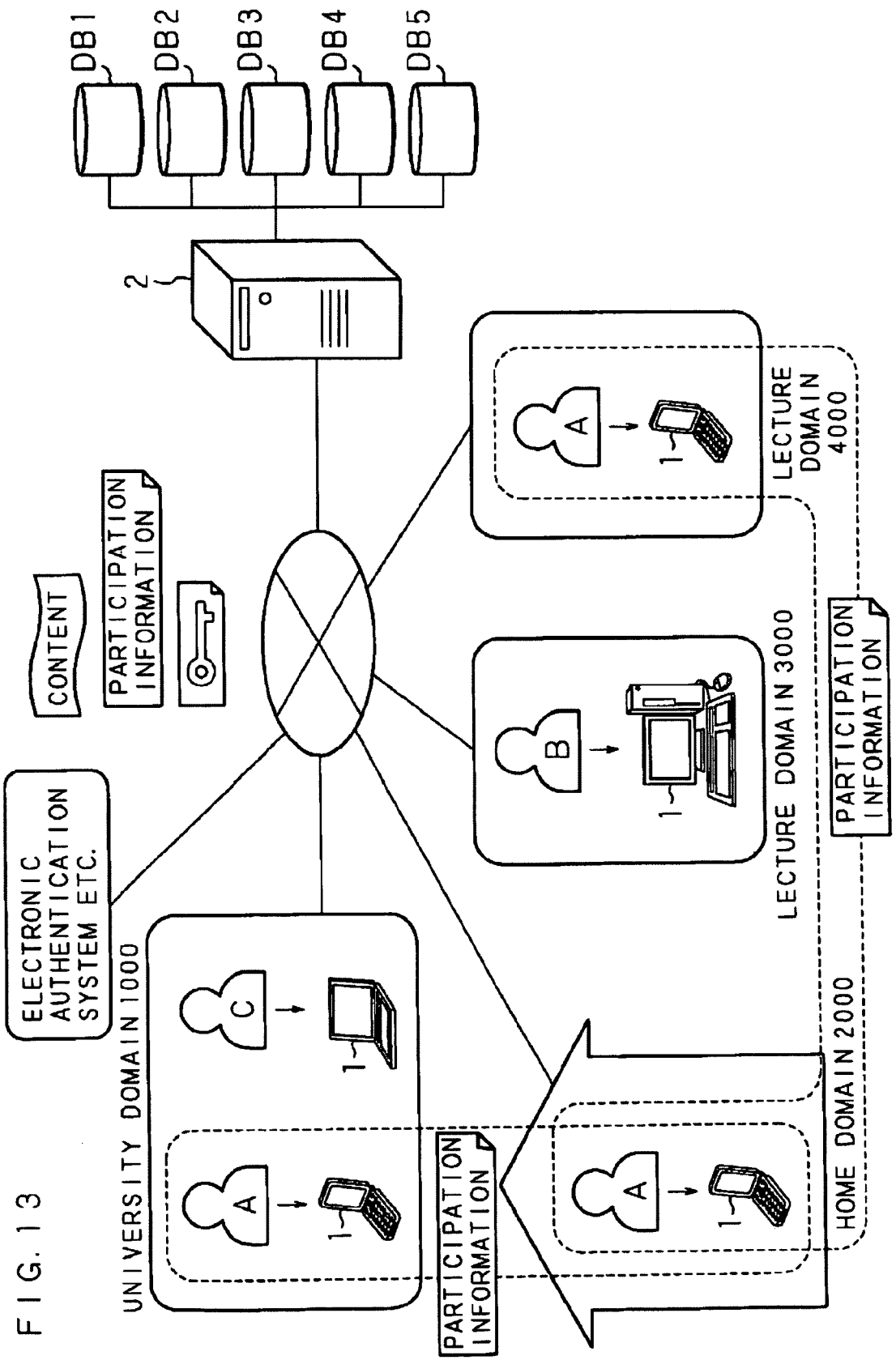
FIG. 13 is a schematic view showing an overall structure of a license distribution system according to a third embodiment.

FIG. 13 is a schematic view showing an overall structure of a license distribution system according to a third embodiment. In the case where the reproducing device 1 of the user A acquires a license in each of the university domain 1000 and the lecture domain 4000 both of which belong to the identical group, and reproduces the content acquired in the university domain 1000 at home after at least the license acquired in the university domain 1000 is expired, it is necessary to reacquire the license acquired in the university domain 1000.

The reproducing device 1 of the user A receives a request for reissuing the license inputted by the user A, and transmits the participation information acquired in the university domain 1000 and the participation information acquired in the lecture domain 4000 together with the received request for reissuing the license, to the server 2.

The server 2 receives the request for reissuing the license and a plurality of participation information items, and confirms the validity of the plurality of received participation information items. The confirmation of the validity is performed by, e.g., verifying the issuer's signatures included in the received participation information items. When the validity of all of the participation information items is confirmed, the server 2 determines a specific privilege related to the license such as a discount on the license fee for the user A or the like. The specific privilege includes, e.g., based on the fact that the reproducing device 1 of the user A has consecutively participated in the university domain 1000 and the lecture domain 4000 both of which belong to the identical group, a higher discount rate than in the case of participation in either one of them.

Figure 14:
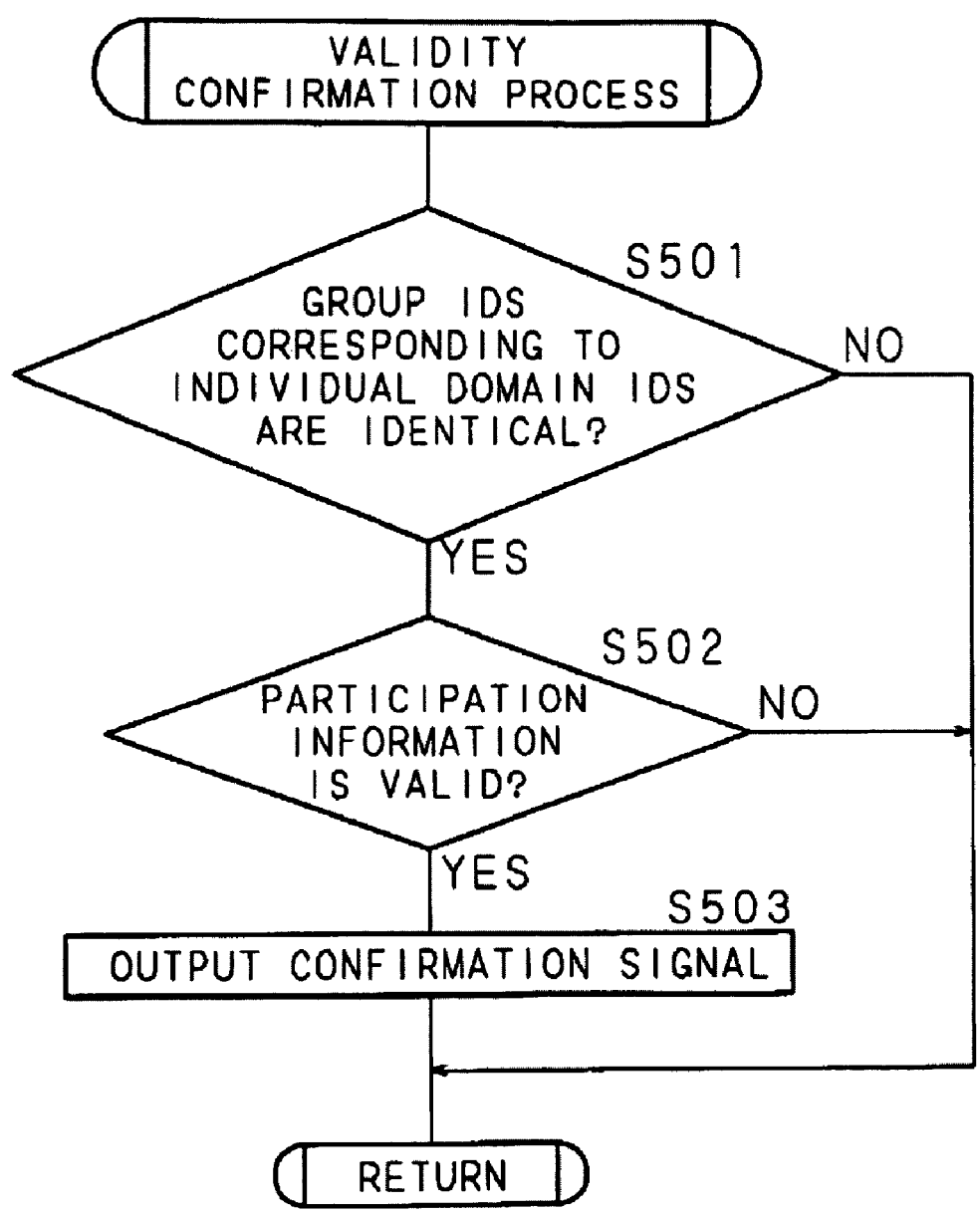
FIG. 14 is an operation flow showing a procedure for a validity confirmation process according to the third embodiment.

Next, a description will be given to the procedure for a validity confirmation process according to the third embodiment. FIG. 14 illustrates an operation flow showing the procedure of the validity confirmation process according to the third embodiment.

The CPU 28 of the server 2 makes an access to the content information database DB1 and extracts group IDs corresponding to the received individual domain IDs. The CPU 28 determines whether or not the extracted group IDs corresponding to the individual domain IDs are identical with each other (S501). As a result, when it is determined that the group IDs corresponding to the individual domain IDs are not identical with each other (NO in S501), the CPU 28 does not output a confirmation signal and suspends the validity confirmation process until the next execution.

Conversely, when it is determined that the group IDs corresponding to the individual domain IDs are identical with each other (YES in S501), the CPU 28 determines whether or not the received participation information items are valid (S502). When it is determined that the received participation information items are not valid (NO in S502), the CPU 28 does not output the confirmation signal and suspends the validity confirmation process until the next execution.

Conversely, when it is determined that the received participation information items are valid (YES in S502), the CPU 28 outputs the confirmation signal (S503) and suspends the validity confirmation process until the next execution.

As for other structure, function, and process procedure, they are the same as described in the first embodiment so that the descriptions thereof will be omitted by using like reference numerals to designate corresponding parts.

Thus, when a plurality of domains are involved, the user A can gain the benefit based on the fact of having participated in a different domain at the time of reissuing the license, and is offered a discount on the fee required for reissuing the license.

In addition, the user A receives a discount in accordance with the participation history showing the consecutive participation in a plurality of domains.

Embodiment 4

The foregoing embodiments have described an example where the server 2 reissues the license for the content acquired by the reproducing device 1 of the user A. However, the present technology is not limited to these embodiments. For example, when the reproducing device 1 of the user A takes over the content acquired by the reproducing device 1 of the user B in the lecture domain 3000, the server 2 may reissue the license for the content taken over by the reproducing device 1 of the user A. That is, when it can be determined that one content and another content can be defined as contents belonging to the identical group, the reproducing device which requests a license for one content may gain the benefit based on the fact of having participated in the domain where another content is acquired.

Figure 15:
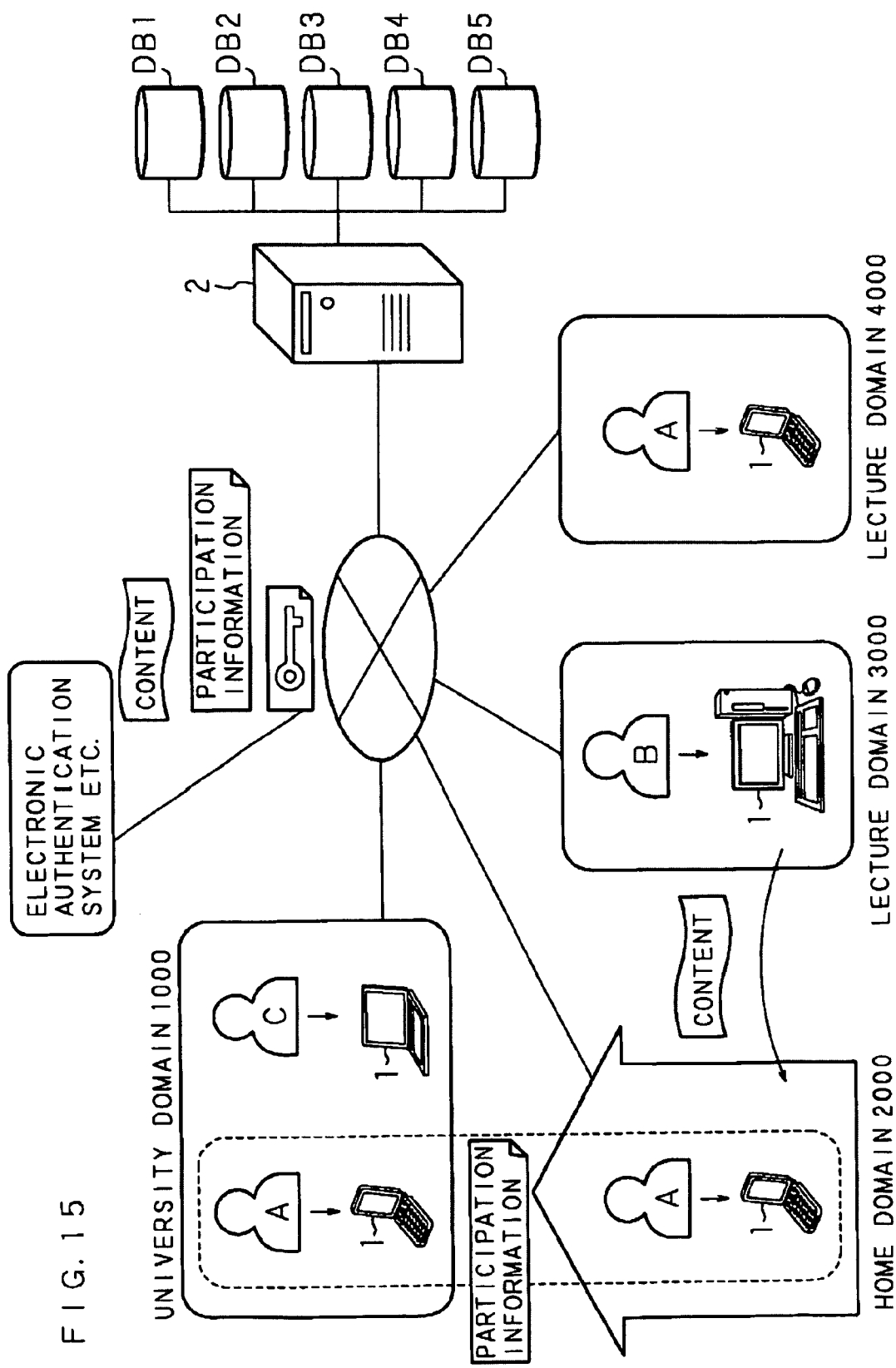
FIG. 15 is a schematic view showing an overall structure of a license distribution system according to a fourth embodiment.

FIG. 15 is a schematic view showing an overall structure of a license distribution system according to a fourth embodiment. In the case where the reproducing device 1 of the user A acquires a license in the university domain 1000, takes over the content acquired by the reproducing device 1 of the user B in the lecture domain 3000, and reproduces the content taken over thereby at home after at least the license acquired in the university domain 1000 is expired, it is necessary to acquire the license to be acquired in the lecture domain 3000.

The reproducing device 1 of the user A takes over the content transferred from the reproducing device 1 of the user B via the recording medium 111 or a network. The reproducing device 1 of the user A receives a request for reissuing the license inputted by the user A, and transmits, together with the received request for reissuing the license, the participation information acquired in the university domain 1000 and the ID of the content taken over thereby to the server 2.

The server 2 receives the request for reissuing the license, the participation information, and the content ID, and confirms the validity of the received participation information. Based on the content information table T1, it is determined whether or not the group to which the received content ID belongs and the group to which the domain ID included in the received participation information belongs are identical with each other. When the validity of the participation information in the group to which the content ID belongs is confirmed, the server 2 determines a specific privilege related to the license such as a discount on the license fee for the user A or the like. The specific privilege includes, e.g., when the content acquired by the reproducing device 1 of the user A in the university domain 1000 and the content taken over thereby from the reproducing device 1 of the user B, both of which belong to the identical group, are part of series contents, a higher discount rate than in the case of acquiring either one of them based on the fact of having consecutively acquired these contents.

Figure 16:
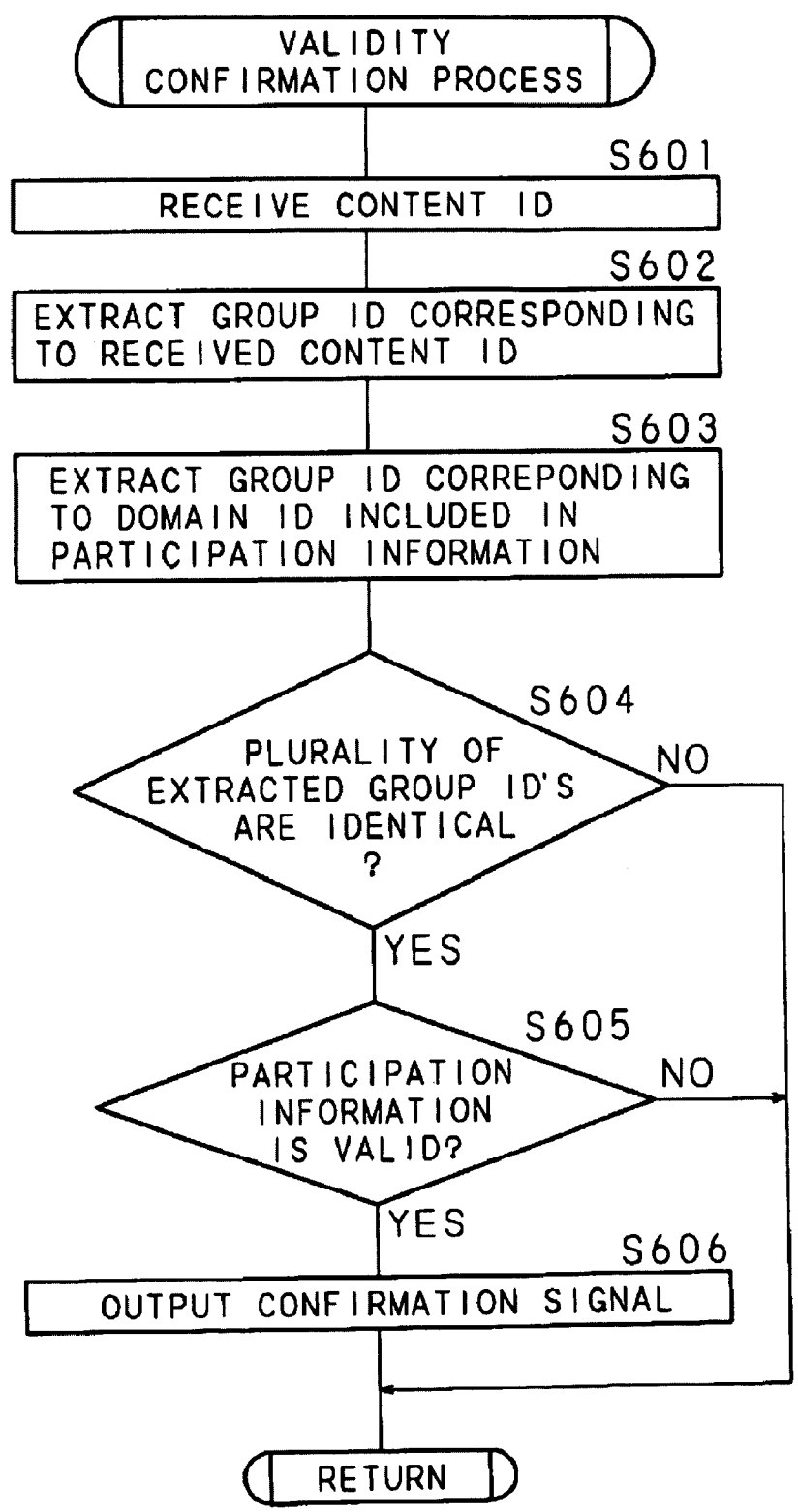
FIG. 16 is an operation flow showing a procedure for a validity confirmation process according to the fourth embodiment.

Next, a description will be given to the procedure for a validity confirmation process according to the fourth embodiment. FIG. 16 illustrates an operation flow showing the procedure for the validity confirmation process according to the fourth embodiment.

The CPU 28 of the server 2 requests the ID of the content taken over from the reproducing device 1 of the user B, i.e., the ID of the content which is subject to the license from the reproducing device 1 of the user A. The reproducing device 1 of the user A transmits the ID of the content subject to the license to the server 2.

The CPU 28 of the server 2 receives the ID of the content which is a license target (S601). The CPU 28 makes an access to the content information database DB1 and extracts a group ID corresponding to the received content ID (S602). The CPU 28 also extracts the group ID corresponding to a domain ID included in the received participation information (S603). The CPU 28 then determines whether or not the plurality of extracted group IDs are identical with each other (S604). When it is determined that the plurality of extracted group IDs are not identical with each other (NO in S604), the CPU 28 does not output a confirmation signal and suspends the validity confirmation process until the next execution.

Conversely, when the plurality of extracted group IDs are identical with each other (YES in S604), the CPU 28 determines whether or not the received participation information is valid (S605). When it is determined that the received participation information is not valid (NO in S605), the CPU 28 does not output the confirmation signal and suspends the validity confirmation process until the next execution.

Conversely, when it is determined that the received participation information is valid (YES in S605), the CPU 28 outputs the confirmation signal (S606) and suspends the validity confirmation process until the next execution.

As for other structure, function, and process procedure, they are the same as described in the first embodiment so that the descriptions thereof will be omitted by using like reference numerals to designate corresponding parts.

Thus, when a plurality of contents are involved, the user A can gain the benefit based on the fact of having participated in a domain where a different content has been acquired at the time of issuing the license so that the user A can be offered a discount on the fee required for reissuing the license.

Embodiment 5

The forgoing embodiments have described an example where the privilege is determined by executing the static additional service determination process when the validity of the participation information is confirmed. However, the present technology is not limited to these embodiments. For example, a dynamic additional service determination process may be executed in which the content of the privilege is changed according to the number of issues of the participation information. That is, a specific privilege may be determined according to the number of participation information items issued in a domain.

Figure 17:
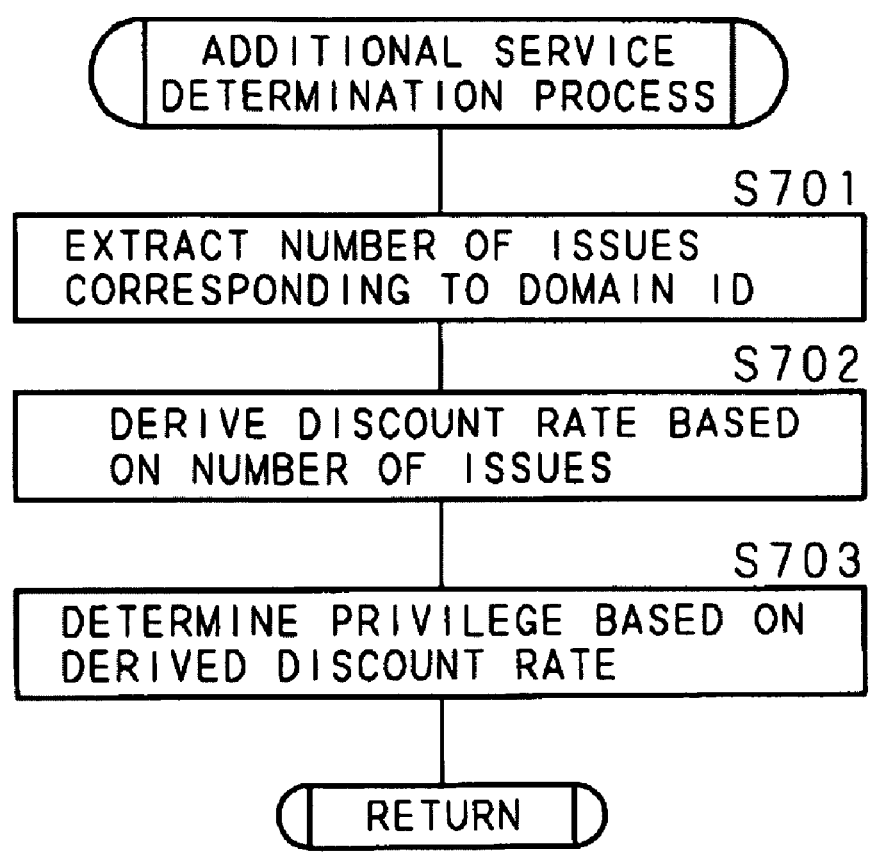
FIG. 17 is an operation flow showing a procedure for an additional service determination process according to a fifth embodiment.

A description will be given to the procedure for an additional service determination process according to a fifth embodiment. FIG. 17 illustrates an operation flow showing the procedure for the additional service determination process according to the fifth embodiment.

The CPU 28 of the server 2 makes an access to the domain attribute information database DB2 and extracts the number of issues corresponding to a domain ID included in the received participation information (S701). The CPU 28 derives a discount rate on the license fee based on the extracted number of issues (S702). For example, a higher discount rate is offered to a user participating in a domain where the number of issues is smaller, i.e., the number of participants is smaller, while a lower discount rate is offered to a user participating in a domain where the number of issues is larger, i.e., the number of participants is larger. The CPU 28 determines the privilege based on the derived discount rate (S703).

Thus, by executing such dynamic additional service determination process as to offer a higher discount rate to a user participating in a domain where the number of issues is smaller, i.e., the number of participants is smaller, the participation in a domain where the number of participants is small can be promoted.

In the present embodiment, by transmitting license information to an external device which requests a license for permitting the reproduction of the content in the domain, the reproduction or duplication of the content is limited to the interior of the domain. Further, by confirming the validity of the participation information transmitted from the external device, the validity of the fact that the external device has participated in the domain is confirmed. Furthermore, when the validity of the participation information is confirmed, by determining a specific privilege information related to the license and transmitting the information to the external device, the benefit based on the fact that the external device has participated in the domain is made available at the time of reissuing the license.

In accordance with the present embodiment, by limiting the reproduction or duplication of the content to the interior of the domain, unlimited spreading of the content can be prevented and proper consideration can be given to copyright protection of the content. In addition, the benefit based on the fact that the external device has participated in the domain can be made available at the time of reissuing the license, thereby giving a user an incentive for reissuing the license so that the circulation of the content can be increased. Moreover, by enhancing the incentive for reissuing the license, it becomes possible to encourage a user to, e.g., reproduce the expired content again or reproduce the content in a different domain, whereby the use of the content can be increased.

As this description may be embodied in several forms without departing from the spirit of essential characteristics thereof, the present embodiment is therefore illustrative and not restrictive, since scope of the description which seeks for protection is defined by the appended claims rather than by description preceding them, and all changes that fall within metes and bounds of the claims, or equivalence of such metes and bounds thereof are therefore intended to be embraced by the claims.

What is claimed is:

1. An information processing apparatus configured to output license information for permitting a reproduction of a content in a domain to a plurality of external devices, the plurality of external devices participating in the domain for managing, as one group, the plurality of external devices which can be authorized by an identical license, the information processing apparatus including:

a database configured to store key information sorted for each domain, for generating the license information, in association with at least domain identification information for identifying each domain, an expiration date which can be authorized by the identical license in each domain, and identification information of the content which is a target of permission by the identical license; and a communication unit configured to transmit participation information including the domain identification information and the expiration date to the external device, each time the external device participates in the domain, wherein the information processing apparatus is configured to receive the participation information together with a request for a license from the external device via the communication unit, the information processing apparatus further includes:

a validity confirmation unit configured to confirm validity of the received participation information; and a privilege determination unit configured to determine a specific privilege related to the license when the validity of the received participation information is confirmed, and the information processing apparatus transmits the license information generated based on the key information corresponding to the domain identification information included in the received participation information and information on the determined specific privilege, to the external device via the communication unit, wherein the database further stores domain-related information which defines a plurality of the domains as one group, the validity confirmation unit includes:
  a determination unit configured to determine, when the participation information of one domain and the participation information of another domain different from the one domain are received from the external device participating in the one domain via the communication unit, whether or not the one domain and the another domain can be defined as domains belonging to an identical group based on the domain-related information; and
  a first confirmation unit configured to confirm the validity of all of the received participation information items when it is determined that the one domain and the another domain can be defined as domains belonging to the identical group, the privilege determination unit determines the specific privilege related to the license when the validity of all of the participation information items are confirmed, and the information processing apparatus includes a generation unit configured to generate the license information based on the key information common to all of the domains whose participation information items have been received, wherein the privilege determination unit includes:
  a deriving unit configured to derive, when the validity of all of the participation information items is confirmed, a history of participation of the external device in each domain based on the confirmed participation information items; and
  a unit configured to determine the specific privilege in accordance with the derived history.

2. The information processing apparatus according to claim 1, wherein
  the participation information includes an issuer's signature, and
  the validity confirmation unit confirms the validity of the participation information by verifying the issuer's signature included in the received participation information.

3. The information processing apparatus according to claim 1, wherein
  the database stores the key information further in association with information on an area which can be authorized by the identical license,
  the communication unit receives positional information transmitted by the external device which detects a position thereof,
  the validity confirmation unit includes a determination unit configured to determine whether or not the position of the external device indicated by the received positional information is within the area, and
  the validity confirmation unit confirms the validity of the received participation information when the determination unit determines that the position of the external device is within the area.

4. The information processing apparatus according to claim 1, further including an acquisition unit configured to acquire a number of issues of the participation information issued for each domain, wherein
  the privilege determination unit includes a unit configured to determine the specific privilege in accordance with the acquired number of issues of the participation information.

5. A license distribution system comprising:
  a plurality of reproducing devices configured to reproduce content, the plurality of reproducing devices participating in a domain for managing, as one group, the plurality of reproducing devices which are authorized by an identical license; and
  a license distribution device configured to be connected to each of the reproducing devices, wherein
  the license distribution device manages the domain and outputs license information for permitting a reproduction of the content in the domain to the reproducing device,
  the license distribution device includes:
    a database configured to store key information sorted for each domain, for generating the license information, in association with at least domain identification information for identifying each domain, an expiration date which can be authorized by the identical license in each domain, and identification information of the content which is a target of permission by the identical license; and
    a first communication unit configured to transmit participation information including the domain identification information and the expiration date to the reproducing device, each time the reproducing device participates in the domain;
  each of the reproducing devices includes:
    a second communication unit configured to receive the participation information transmitted by the license distribution device and transmits the received participation information together with a request for a license,
  the license distribution device receives the participation information transmitted by the reproducing device via the first communication unit,
  the license distribution device further includes:
    a validity confirmation unit configured to confirm validity of the received participation information; and
    a privilege determination unit configured to determine a specific privilege related to the license when the validity of the received participation information is confirmed, and
  the license distribution device transmits the license information generated based on the key information corresponding to the domain identification information included in the received participation information, and information on the determined specific privilege, to the reproducing device via the first communication unit, wherein
  the database further stores domain-related information which defines a plurality of the domains as one group,
  the validity confirmation unit includes:
    a determination unit configured to determine, when the participation information of one domain and the participation information of another domain different from the one domain are received from the reproducing device participating in the one domain via the communication unit, whether or not the one domain and the another domain can be defined as domains belonging to an identical group based on the domain-related information; and a first confirmation unit configured to confirm the validity of all of the received participation information items when it is determined that the one domain and the another domain can be defined as domains belonging to the identical group, the privilege determination unit determines the specific privilege related to the license when the validity of all of the participation information items are confirmed, and the license distribution device includes a generation unit configured to generate the license information based on the key information common to all of the domains whose participation information items have been received, wherein the privilege determination unit includes:

a deriving unit configured to derive, when the validity of all of the participation information items is confirmed, a history of participation of the reproducing device in each domain based on the confirmed participation information items; and a unit configured to determine the specific privilege in accordance with the derived history.

6. An information processing apparatus which outputs license information for permitting a reproduction of a content in a domain to a plurality of external devices, the plurality of external devices participating in the domain for managing, as one group, the plurality of external devices which can be authorized by an identical license, the information processing apparatus including:

a database configured to store key information sorted for each domain, for generating the license information, in association with at least domain identification information for identifying each domain, an expiration date which can be authorized by the identical license in each domain, and identification information of the content which is a target of permission by the identical license; and a communication unit configured to transmit participation information including the domain identification information and the expiration date to the external device, each time the external device participates in the domain, wherein the information processing apparatus receives the participation information together with a request for a license from the external device via the communication unit, the information processing apparatus further includes a processor configured to capable of perform the operations of:

confirming validity of the received participation information; and determining a specific privilege related to the license when the validity of the received participation information is confirmed, and the information processing apparatus transmits the license information generated based on the key information corresponding to the domain identification information included in the received participation information, and information on the determined specific privilege, to the external device via the communication unit, wherein the database further configured to store domain-related information which defines a plurality of the domains as one group, the processor of the information processing apparatus also configured to perform operations of:

determining when the participation information of one domain and the participation information of another domain different from the one domain are received from the external device participating in the one domain via the communication unit, whether or not the one domain and the another domain can be defined as domains belonging to an identical group based on the domain-related information;

confirming the validity of all of the received participation information items when it is determined that the one domain and the another domain can be defined as domains belonging to the identical group; and deriving, when the validity of all of the participation information items is confirmed, a history of participation of the external device in each domain based on the confirmed participation information items; and determining the specific privilege in accordance with the derived history.

* * * * *